United States Patent [19]

Rhodes

[11] Patent Number: 5,208,659

[45] Date of Patent: May 4, 1993

[54] METHOD AND APPARATUS FOR INDEPENDENTLY TRANSMITTING AND RECAPTURING CLOCK RECOVERY BURST AND DC RESTORATION SIGNALS IN A MAC SYSTEM

[75] Inventor: Charles W. Rhodes, Atlanta, Ga.

[73] Assignee: Scientific Atlanta, Inc., Atlanta, Ga.

[21] Appl. No.: 445,101

[22] Filed: Dec. 7, 1989

Related U.S. Application Data

[63] Continuation of Ser. No. 248,249, Sep. 19, 1988, abandoned, which is a continuation of Ser. No. 870,036, Jun. 3, 1986, abandoned.

[51] Int. Cl.$^5$ ............................................. H04N 11/10
[52] U.S. Cl. ...................................................... 358/12
[58] Field of Search ........................ 358/14, 19, 20, 34, 358/12

[56] References Cited

U.S. PATENT DOCUMENTS

| | | | |
|---|---|---|---|
| 2,820,091 | 1/1958 | Parker et al. | 358/19 |
| 2,843,666 | 7/1958 | Preisig | 358/19 |
| 3,716,656 | 2/1973 | Lambert | 358/11 |
| 3,949,418 | 4/1976 | Srivastava | 358/34 |
| 4,122,492 | 10/1978 | Gallo | 358/34 |
| 4,134,127 | 1/1979 | Campioni | 358/16 |
| 4,245,235 | 1/1981 | Poetsch | 358/14 |
| 4,268,853 | 5/1981 | Nakamura et al. | 358/17 |
| 4,295,161 | 10/1981 | Hettiger | 358/34 |
| 4,446,482 | 5/1984 | Srivastava | 358/20 |
| 4,533,936 | 8/1985 | Tiemann et al. | 358/12 |
| 4,554,577 | 11/1985 | Shanley | 358/34 |

FOREIGN PATENT DOCUMENTS

| | | |
|---|---|---|
| 0167430 | 1/1986 | European Pat. Off. |
| 0170267 | 2/1986 | European Pat. Off. |
| 0098112 | 2/1979 | Japan |
| 219083 | 12/1984 | Japan ..................... 358/133 |
| 1018715 | 2/1966 | United Kingdom |

OTHER PUBLICATIONS

Dobbie, A DBTV System for Optimum Bandwidth Efficiency, IEEE Transactions on Consumer Electronics, vol. CE-33, No. 1 Feb. 1987 pp. 58–64.
(A) Lucas, B-MAC, 8012 S.M.P.T.E. Journal, 94 (1985) Nov., No. 11, N.Y., USA.
(D) Dosch, Rundfunktechnische Mitteilungen, vol. 29, No. 5, Sep./Oct. 1985.
(E) Stallard, C-MAC-A High Quality Television Service for DBS, 8087 IEEE Transactions on Consumer Electronics vol. CE-29 (1983) Aug., No. 3, N.Y., USA.

*Primary Examiner*—John W. Shepperd
*Attorney, Agent, or Firm*—Banner, Birch, McKie & Beckett

[57] ABSTRACT

The present invention is directed to improving immunity to channel distortions of multiplexed analog component television signals by independently transmitting a clock recovery burst and a DC restoration reference level during the horizontal blanking interval of a video line. More particularly, the clock recovery burst and the DC restoration reference level are transmitted on independent lines. The integrity of the television receiver's system is not compromised if the clock recovery burst is not transmitted on every line. Accordingly, the problems inherent in the prior art are avoided by independently transmitting the clock recovery burst and the DC restoration reference level on separate lines during a portion of the horizontal blanking interval of the respective lines. The clock recovery burst and the DC restoration reference level could be transmitted on alternate lines or the clock recovery burst could be sent every Nth line with the DC restoration reference level transmitted on lines therebetween.

17 Claims, 3 Drawing Sheets

METHOD AND APPARATUS FOR INDEPENDENTLY TRANSMITTING AND RECAPTURING CLOCK RECOVERY BURST AND DC RESTORATION SIGNALS IN A MAC SYSTEM

This application is a continuation of application Ser. No. 248,249, filed Sep. 19, 1988, now abandoned, which is a continuation of application Ser. No. 870,036, filed Jun. 3, 1986, now abandoned.

BACKGROUND OF THE INVENTION

1. Technical Field

The present invention is directed to improving immunity to channel distortions of multiplexed analog component television signals by independently transmitting a clock recovery burst and a DC restoration reference level during the horizontal blanking interval of a video line. More particularly, the clock recovery burst and the DC restoration reference level are transmitted on independent lines.

2. Background Information

Time division multiplexed analog component (MAC) television signals, a typical line of which is shown with reference of FIG. 1, includes a horizontal blanking interval (HBI) 12, in which no picture information is transmitted, followed by a chrominance signal 14 and a luminance signal 16, either of which may be time-compressed. Between the chrominance and luminance signals is a guard band 18 to assist in preventing interference between the two signals.

The MAC color television signal of FIG. 1 is obtained by generating conventional luminance and chrominance signals (as would be done to obtain a conventional NTSC or other composite color television signals) and then sampling and storing them separately. Luminance is sampled at a luminance sampling frequency and stored in a luminance store, while chrominance is sampled at a chrominance sampling frequency and stored in a chrominance store. The luminance or chrominance samples may then be compressed in time by writing them into a store at their individual sampling frequency and reading them from the store at a higher frequency. A multiplexer selects either the luminance store or the chrominance store, at the appropriate time during the active line period, for reading, thus creating the MAC signal. If desired, audio samples may be transmitted during the HBI; these are multiplexed (and may be compressed) in the same manner as the video samples. The sample rate at which all samples occur in the multiplexed MAC signal is called the MAC sampling frequency.

In the transmission of all typical MAC signals, a reference clock frequency burst is also transmitted during the HBI. The reference burst is typically about ten cycles of a constant amplitude sinusoid at a subharmonic of the MAC sampling frequency and is used at the receiver for both clock recovery and DC restoration (clamping). The frequency of the reference clock burst is used for clock recovery, while the average of the reference clock burst (ideally zero) is used for clamping. It is of great importance to accurately DC restore the video signal after transmission and clamp on the luminance (or pedestal) value upon which these reference clock burst sinusoids are superimposed. The chrominance values obtained for transmission are relative to a given reference brightness level, represented by the DC level of the signal. Accordingly, it is necessary that the received signal be referred to that reference level to provide accurate reconstruction of the received signal on a display. This reference level is hereinafter referred to as the DC restoration reference level.

Several problems exist with the prior art method of obtaining the DC restoration value by averaging the reference clock burst. For example, if the discriminator at the receiver (Foster-Seeley or FM discriminator) is misaligned, the average value of the reference clock burst is not at its ideal zero reference point. Additionally, if a large data value either before or after the reference clock burst occurs, when the clock burst is low pass filtered, the data value may cause interference and consequently shift the DC level. Furthermore, any other distortion classically inherent in FM discriminators will cause an error to occur when the DC restoration reference level is obtained by averaging the reference clock burst.

This error, sometimes referred to as chrominance/luminance intermodulation, is a non-linear distortion particularly likely to be encountered in FM discriminators as a result of misalignment or drift. It may also occur in a wide variety of baseband video amplifiers, especially as a result of differences in circuit component value tolerences. A test signal has been developed specifically to measure this distortion in an FM demodulator. See Int'l Radio Consultative Comm., Recommendations And Reports Of the CCIR, Transmission of Sound Broadcasting and Television Signals Over Long Distances, Vol. XII, pps. 13, 20 (XVth Plenary Assembly, Geneva 1982).

In FM systems operating at or below the threshold C/N, the clock recovery burst may be corrupted by impulsive noise. This is because, during transmission of the bursts, the carrier frequency deviates substantially away from the center of the channel. Such impulsive noise can therefore corrupt any DC restoration process based upon the prior art method of clamping during the burst.

One solution to this problem is to provide a separate clock recovery burst and DC restoration reference level in each transmitted line. If the reference clock burst and the DC restoration reference level were both about 3 us per line, these two intervals would represent approximately 10% of the typical 63.5 us line. This approach is uneconomical; not only will the bandwidth required for transmission be increased, but the signal-to-noise ratio would also be increased, requiring a larger antenna reflector and/or a more costly Low Noise Amplifier.

SUMMARY OF THE INVENTION

The problems inherent with trying to obtain the DC restoration reference level from the reference burst lie from the fact that the two values are not related, as well as from the distortions classically inherent in FM discriminators. Accordingly, it is an object of the present invention to transmit the clock recovery burst and the DC restoration reference level independently of each other.

It is further an object of the present to transmit these values on separate lines.

According to the objects of the present invention, I have found that the integrity of the television receiver's system is not compromised if the clock recovery burst is not transmitted on every line. In fact, a substantial majority of the transmitted lines per frame need not have the clock recovery burst present for proper operation. Accordingly, the problems inherent in the prior art are avoided by independently transmitting the clock recovery burst and the DC restoration reference level on separate lines during a portion of the horizontal blanking interval of the respective lines. The clock recovery burst and the DC restoration reference level could be transmitted on alternate lines or the clock recovery burst could be sent every Nth line with the DC restoration reference level transmitted on lines therebetween.

DESCRIPTION OF THE PREFERRED EMBODIMENTS

Figure 1:
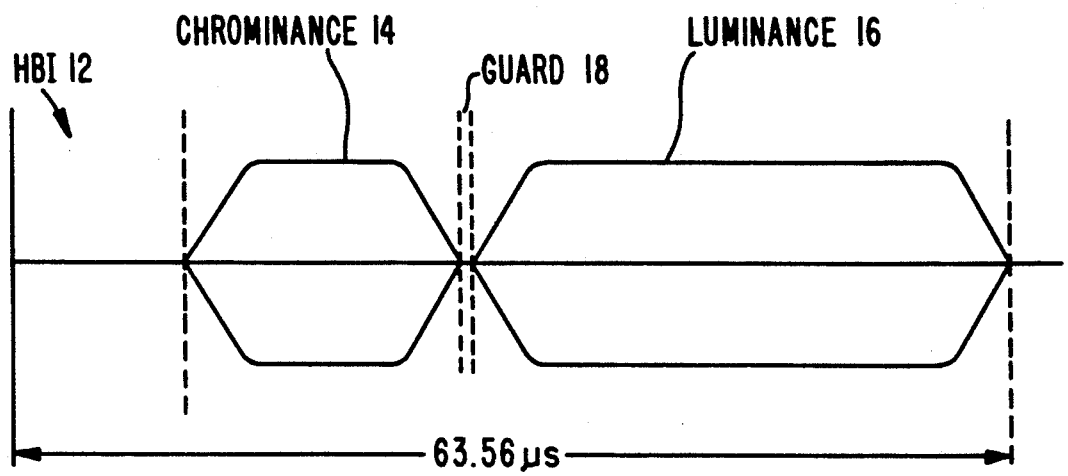
FIG. 1 is an amplitude-vs.-time diagram of a single video line of a MAC signal.
Figure 2:
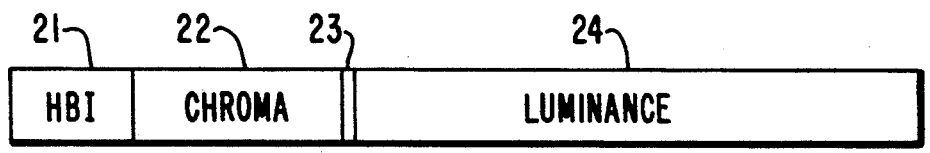
FIG. 2 illustrates a line of a MAC video signal.
Figure 3:
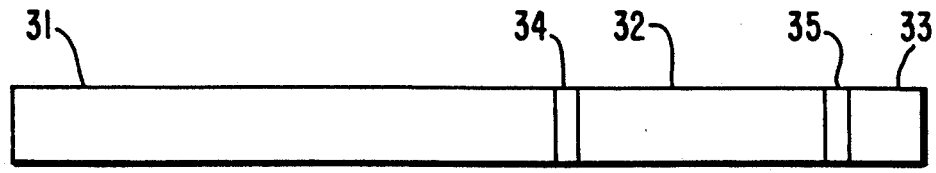
FIG. 3 illustrtes a detailed view of the horizontal blanking interval of the line shown in FIG. 2.
Figure 4:
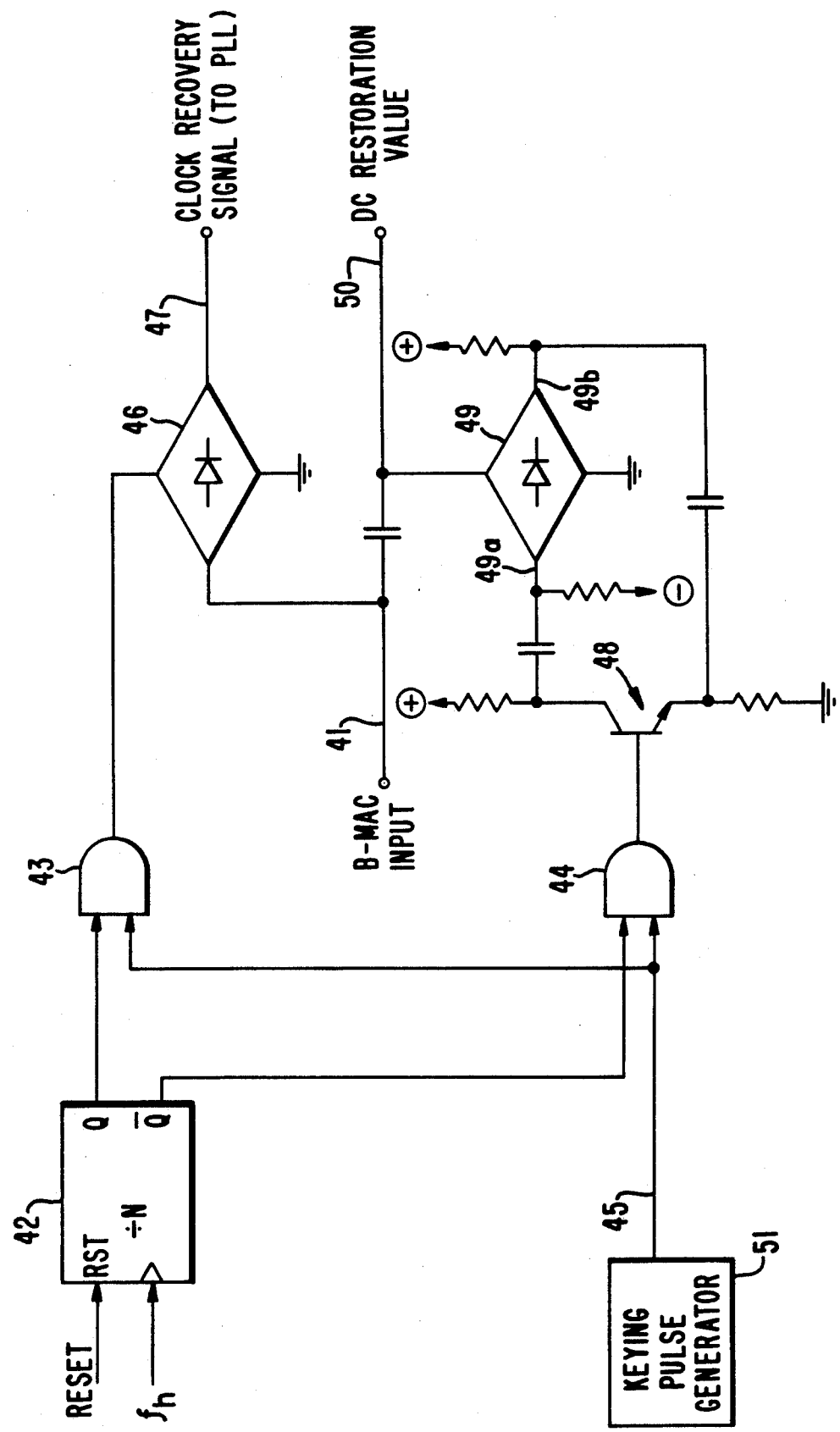
FIG. 4 illustrates the block diagram of the circuitry required to recover the clock recovery burst and the DC restoration reference level transmitted during the horizontal blanking interval of FIG. 2.
Figure 5A:
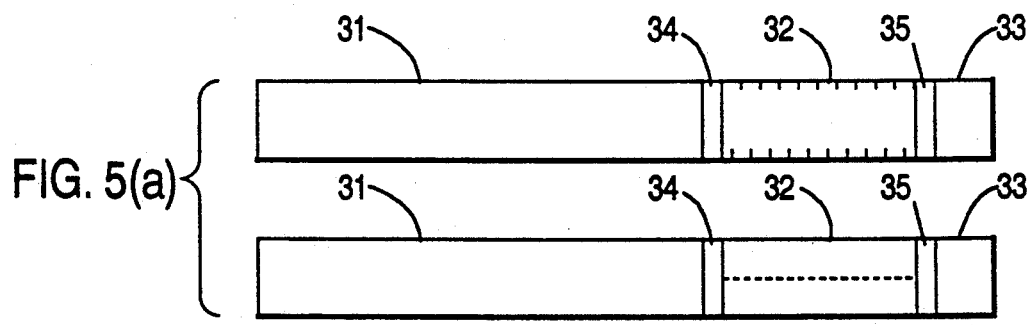
FIGS. 5A-5C show sequences of lines with the first line having a clock recovery signal and subsequent lines having a DC restoration reference level.
Figure 5B:
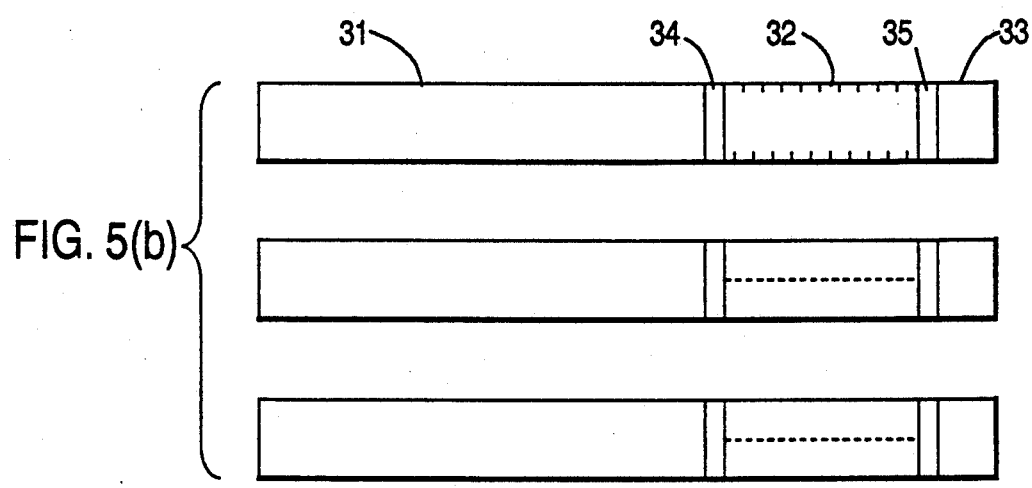
Figure 5C:
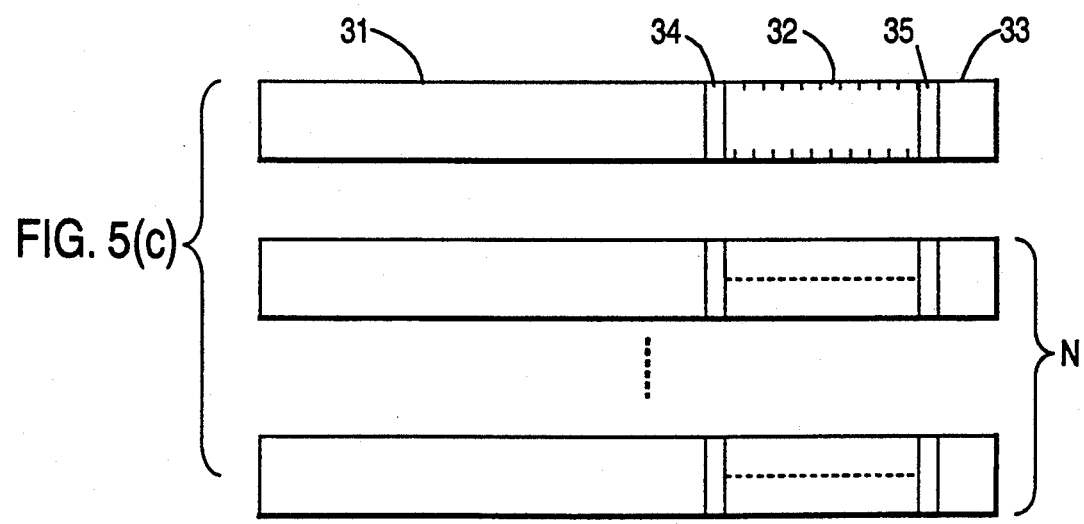

With reference to FIGS. 2 through 4, the transmission and recovery of the clock recovery burst and the DC restoration reference level will now be described. As shown in FIG. 2, a line of a MAC video signal comprises a time segment for horizontal blanking interval (HBI) 21, chrominance component 22, guard band 23 and luminance component 24. Turning now to FIG. 3, a detailed view of the horizontal blanking interval of the line shown in FIG. 2 is now described with reference to the multiplexed analog component transmission system developed by the assignees of the present invention, typically referred to as B-MAC. As shown in FIG. 3, the horizontal blanking interval comprises data segments 31, 32 and 33, separated by guard bands 34 and 35.

In the preferred embodiment, the HBI comprises 78 symbols divided as 45 4-level data symbols for data segment 31; 20 4-level data symbols segment 32; 6 4-level data symbols for data segment 33; and 2 symbols for each guard band 34 and 35. In an embodiment involving line translational scrambling, however, although the length of the data segment 32 is constant, the overall length of the HBI varies, as described in detail in pending U.S. application Ser. No. 507,565 filed Jun. 24, 1983 and Ser. No. 736,301 filed May 21, 1985, both of which are herein incorporated by reference.

Data segment 32 is used to transmit either the clock recovery burst or the DC restoration reference level, depending upon the transmitted line in question. During transmission of the clock recovery burst, data segment 32, which is preferably approximately 2.8 us in duration, comprises a sine wave of alternating minima and maxima of the 4-level data values and represents a clock recovery burst having constant amplitude and a frequency of the MAC reference frequency. During the transmission of the DC restoration reference level, data segment 32 preferably comprises twenty symbols of data at 50 IRE (i.e., the exact center of the dynamic range). By transmitting the DC restoration reference level as 50 IRE, the signal, centered in the channel, is much less effected by impulsive noise. Data segments 31 and 33 include other data, such as audio and/or digital data, a description of which is both known in the art and not necessary for a full understanding of the present invention.

Turning now to FIG. 4, the block diagram of the circuitry at the receiver required to recover the clock recovery burst and the DC restoration reference level which was transmitted during the horizontal blanking interval as just described is now discussed.

In the preferred embodiment, the clock recovery burst is transmitted on every other line, and the received B-MAC signal is input at line 41. Divide-by-N counter 42 is preferably a divide-by-2 counter and is reset according to the field rate reset pulse and is clocked by the line frequency $f_h$. The outputs of counter 42 are arranged such that AND gates 43 and 44 are enabled mutually exclusive of each other by tying one of the two inputs to Q and Q-bar, respectively. The other input to AND gates 43 and 44 is the keying pulse of line 45 which occurs during data segment 32 (of FIG. 3) of the horizontal blanking interval and has a duration of the twenty symbol data segment, preferably about 2.8 us. The keying pulses are generated by a key pulse generator (not shown), the construction of which will be obvious to those skilled in the art. When a first line is received at input 41, and assuming that the first line contains a clock recovery burst as described above, AND gate 43 is enabled and the clock recovery burst is allowed to pass through transmission gate 46 to the phase-locked loop circuitry (not shown) connected to line 47. During alternately occuring lines, AND gate 44 is enabled, thereby turning on transistor 48 and allowing the 50 IRE signal, produced by input sides 49a and 49b of transmission gate 49 to pass through the system at line 50. It is to be noted that the minima and maxima voltage values coupled to points 49a and 49b, respectively, represent the minima and maxima of the four-way data contained in the transmitted line of FIG. 2

Althought the preferred embodiment has been described with reference to transmitting the clock recovery burst and the DC restoration reference level on alternate lines, it is also possible to transmit the clock recovery burst on every third line, with the DC restoration reference level transmitted on lines therebetween. In an embodiment of this type, divide-by-N counter 42 would be replaced with a divide-by-three counter, and the reset pulse into the counter would become the frame rate reset pulse (i.e., reset on line 1 of each field).

It is still further possible to transmit the clock recovery burst on every Nth line with the reset pulse into clock counter 42 preferably being the frame rate reset pulse provided that the number (N+1) is an integer multiple of the number of lines per frame. Additionally, it is also possible to transmit the DC restoration reference level every Nth line, with the clock recovery burst transmitted on lines therebetween.

In another embodiment, the DC restoration reference level is transmitted as an analog pulse having a value well above "white" (100 IRE), for example 140 IRE, or a value well below "black" (0 IRE), for example—40 IRE. In this way, DC restoration can be accomplished very easily because the pulse itself acts as its own keying signal, allowing a diode arrangement (i.e., peak detector circuitry) to clamp the signal. The effect of this embodiment is that, if the signal is scrambled, the signal can be easily DC restored anywhere in the transmission path without the need to authorize a MAC decoder within the transmission system, thereby insuring scrambling integrity at points within the transmission system where de-scrambling is either not authorized or undesirable.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What I claim as my invention is:

1. In a frequency modulated time division multiplexed analog component video signal having a line which includes a luminance component, a chrominance component and a horizontal blanking interval which comprises either a clock recovery burst or a DC restoration level, but not both, the method of transmitting multiple lines of the video signal comprising the steps of:
   transmitting a first line of the video signal wherein the horizontal blanking interval comprises the clock recovery burst; and
   transmitting N subsequent lines of the same video signal wherein
   a) N is an integer greater than 1 and less than the number of lines per field in the video system, and
   b) the horizontal blanking interval comprises the DC restoration reference level.

2. The method of claim 1, wherein N=2.

3. The method of claim 1, wherein the DC restoration reference level is a signal corresponding to 50 IRE.

4. The method of claim 3 wherein N=2.

5. The method of claim 1, wherein the DC restoration reference level is a fixed level substantially above 100 IRE.

6. The method of claim 5, wherein N=2.

7. The method of claim 1, wherein the DC restoration reference level is a fixed level substantially below 0 IRE.

8. The method of claim 7, wherein N=2.

9. In a video signal receiver for receiving multiple lines of a frequency modulated time division multiplexed analog component video signal having either a clock recovery burst or a DC restoration reference level transmitted during a predetermined portion of each line's horizontal blanking interval, a device for recapturing the clock recovery burst and the DC restoration reference level comprising:
   first pulse generating means for generating a first enable pulse whose timing and duration correspond substantially to the predetermined portion of each line's horizontal blanking interval;
   second pulse generating means having first and second output ports for generating a second enable pulse having a duration corresponding to the transmitted line time and alternately outputting said second enabled pulse at said first and second output ports after every N line time durations;
   first coincidence gate coupled to said first pulse generating means and the first output port of said second pulse generating means to output a first gating signal during the coincidence of said first enable signal and said second enable signal at the first output port;
   first gating means coupled to said first coincidence gate for receiving the transmitted video lines and outputting a portion of the video line corresponding to said first gating signal;
   second coincidence gate coupled to said first pulse generating means and the second output port of said second pulse generating means to output a second gating signal during the coincidence of said first enable signal and said second enable signal at the second output port; and
   second gating means coupled to said second coincidence gate for outputting a reference level value signal corresponding to the duration of said second gating signal.

10. The device of claim 9, wherein N=1.

11. The device of claim 9, wherein N=2.

12. The device of claim 9, wherein the transmitted video lines are received at said second gating means.

13. The device of claim 9, wherein said portion of the video line corresponding to said first gating signal output from said first gating means is the clock recovery burst.

14. The device of claim 9, wherein said reference level value signal corresponding to the duration of said second gating signal output from said second gating means in the DC restoration reference level.

15. The device of claim 14, wherein said reference level value signal has a value of 50 IRE.

16. The device of claim 14, wherein said reference level value signal has a fixed value substantially above 100 IRE.

17. The device of claim 14, wherein said reference level value signal has a fixed value substantially below 0 IRE.

* * * * *